May 22, 1923.
W. LEWIS
ROLL OVER MOLDING MACHINE
Filed May 13, 1921
1,456,318
7 Sheets-Sheet 3
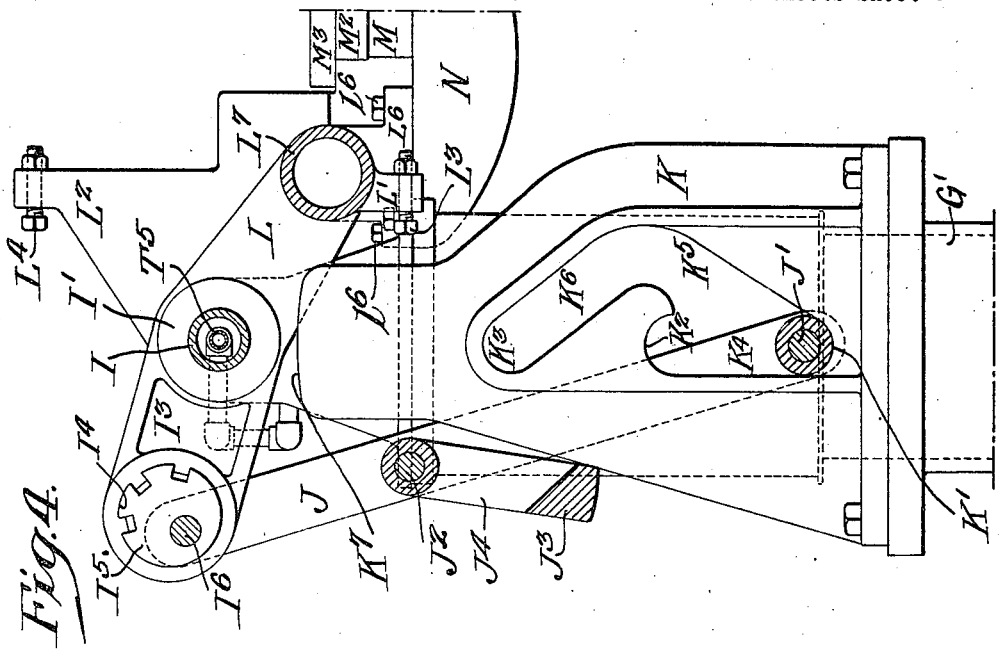
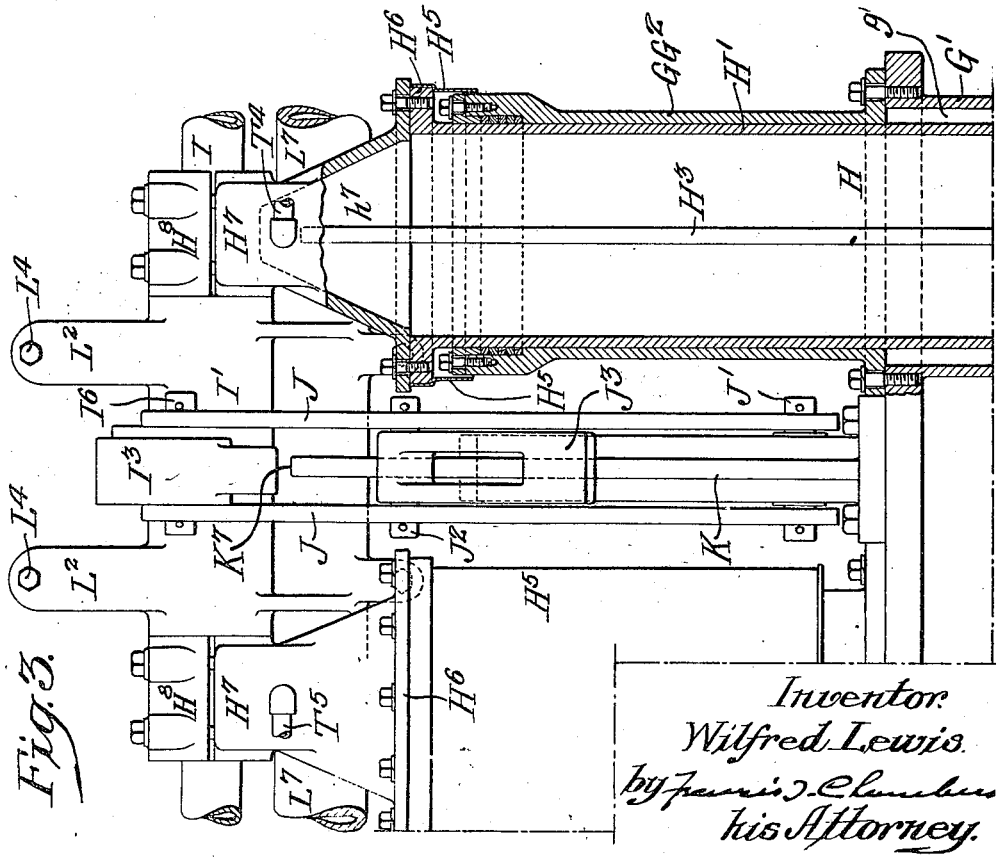
Inventor:
Wilfred Lewis.
by Francis T. Chambers
his Attorney.

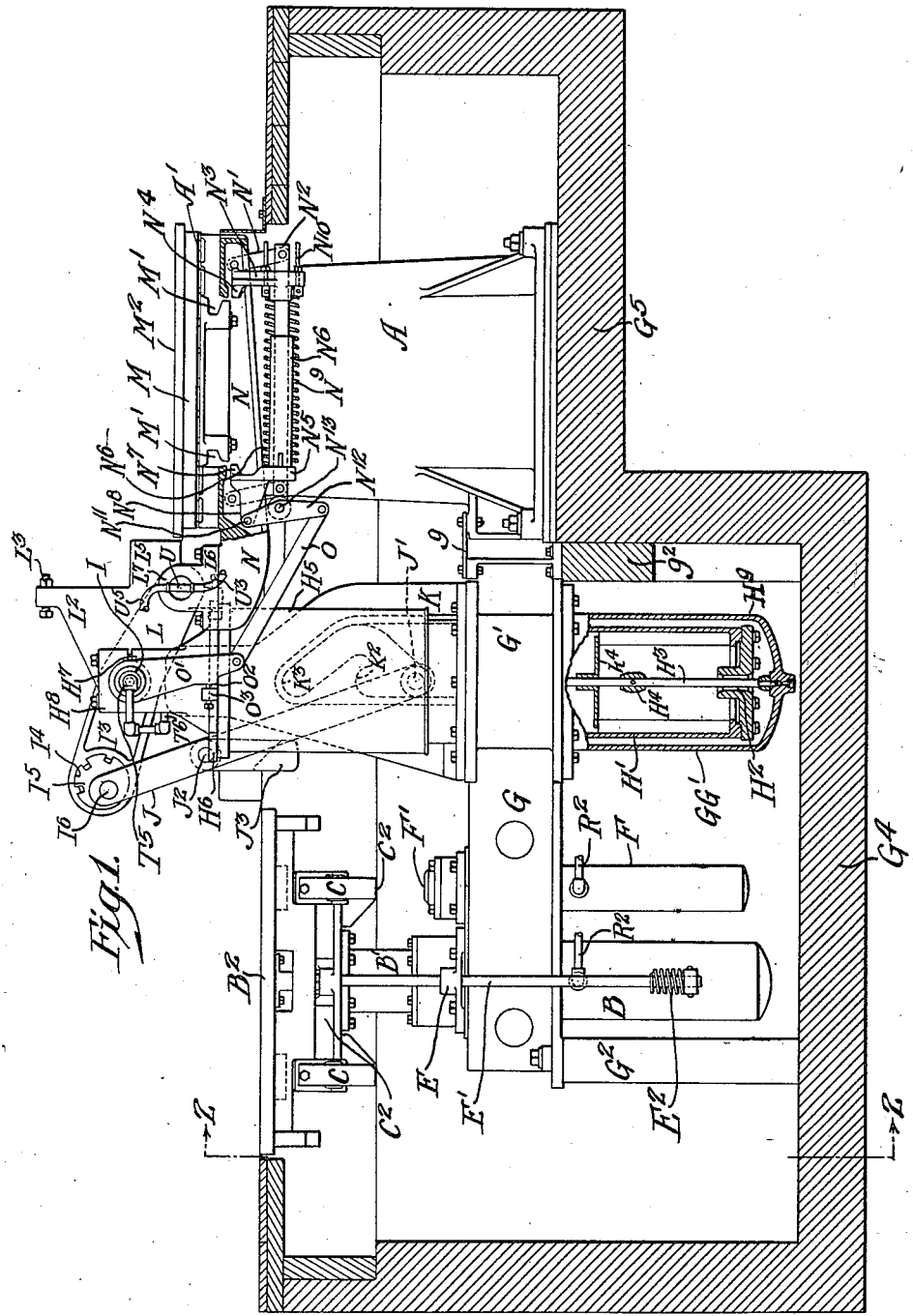

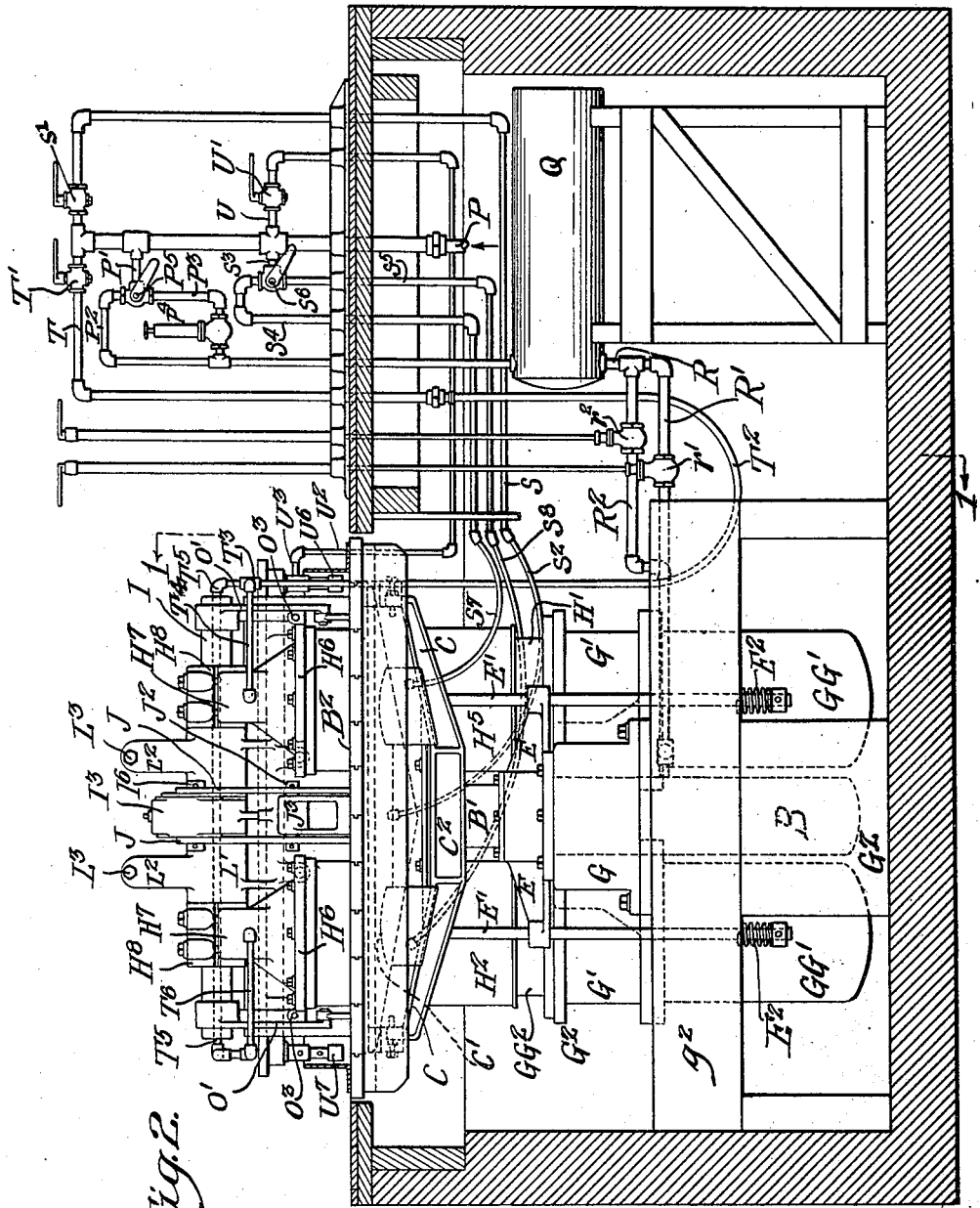

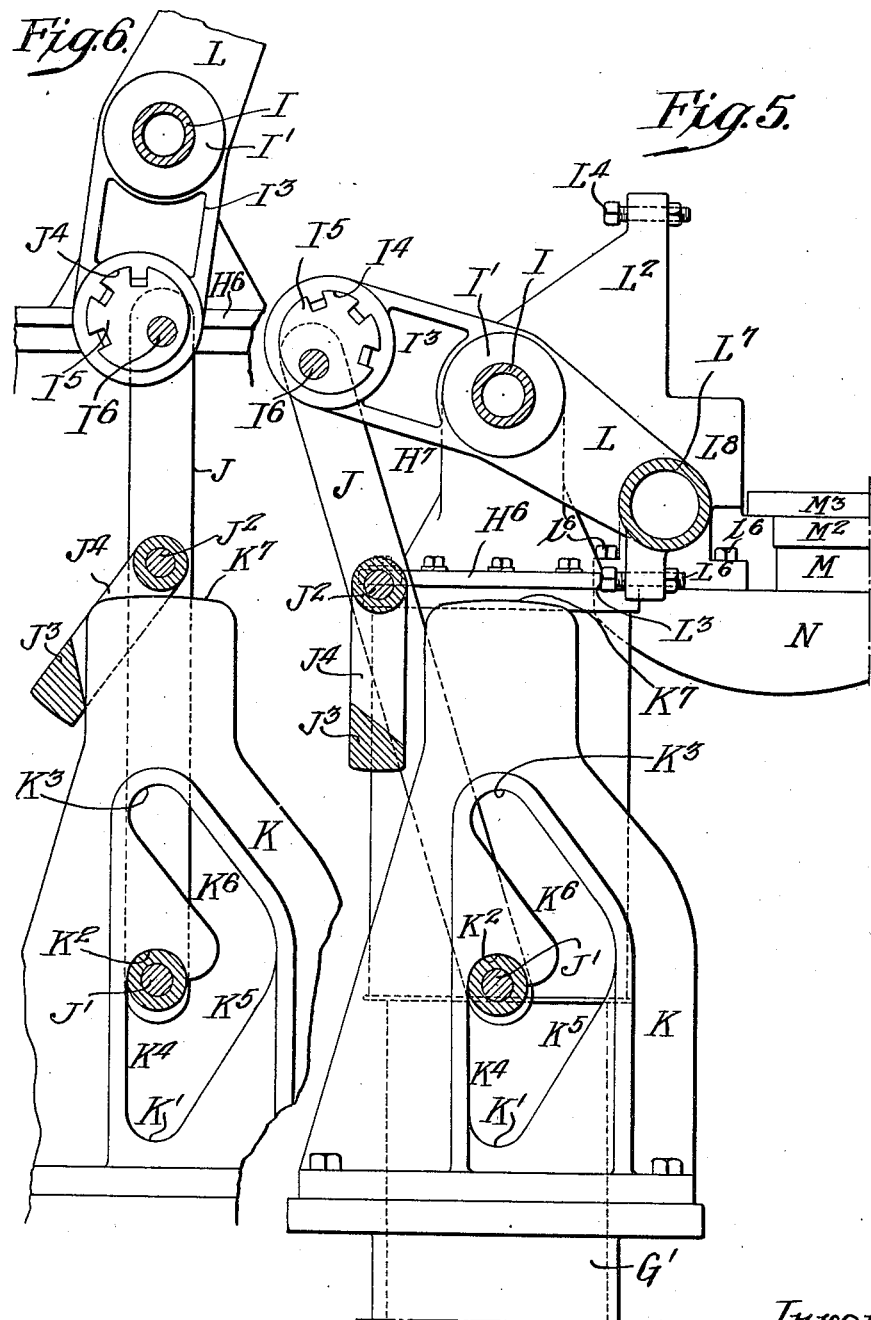

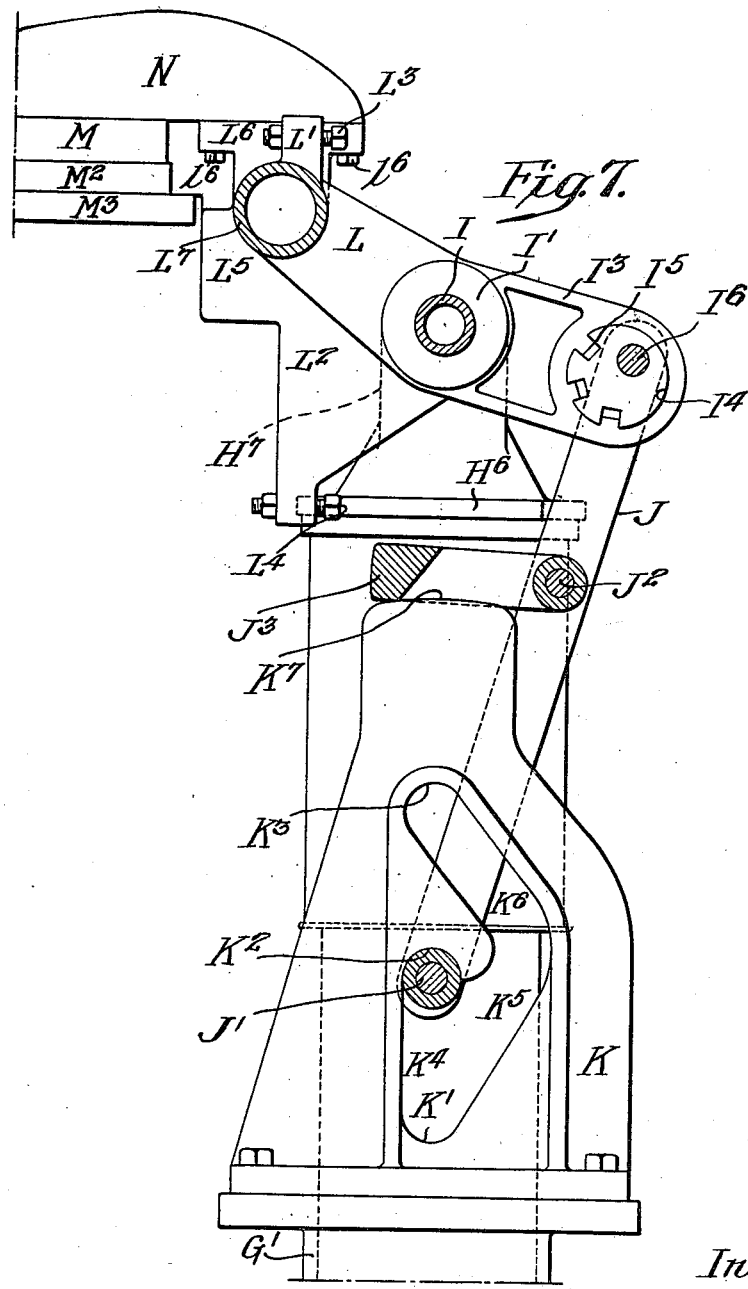

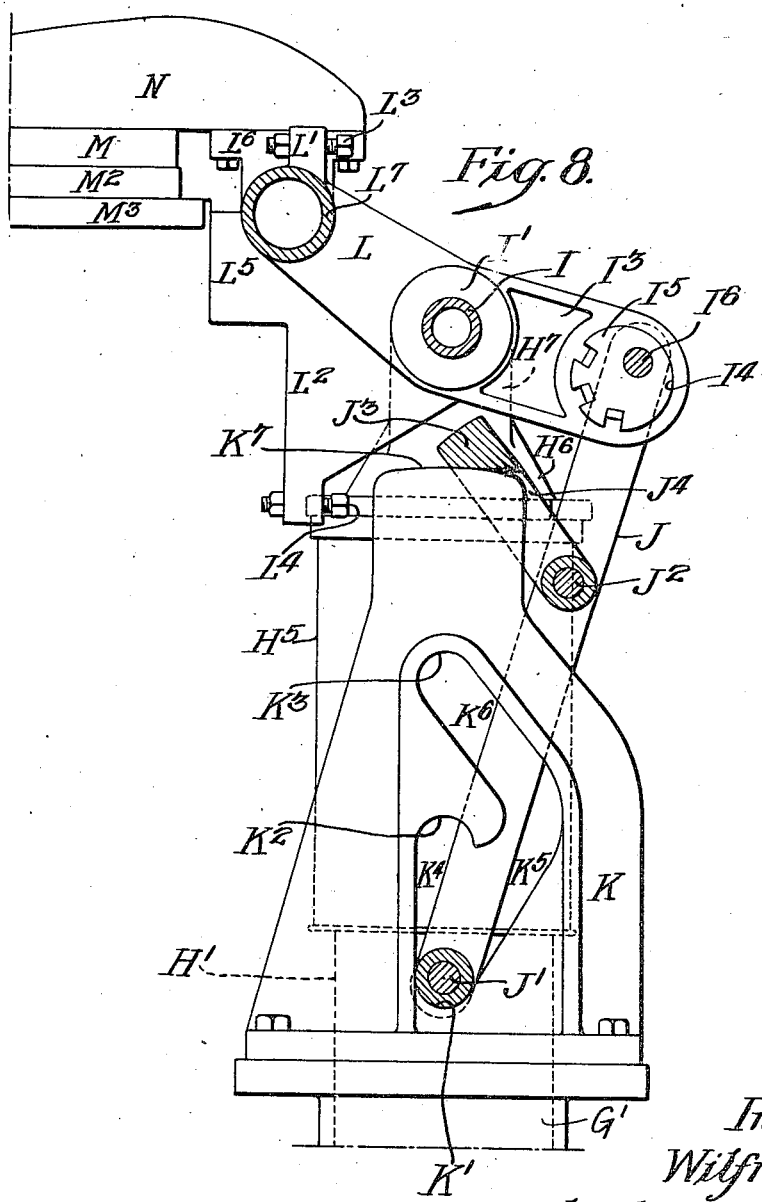

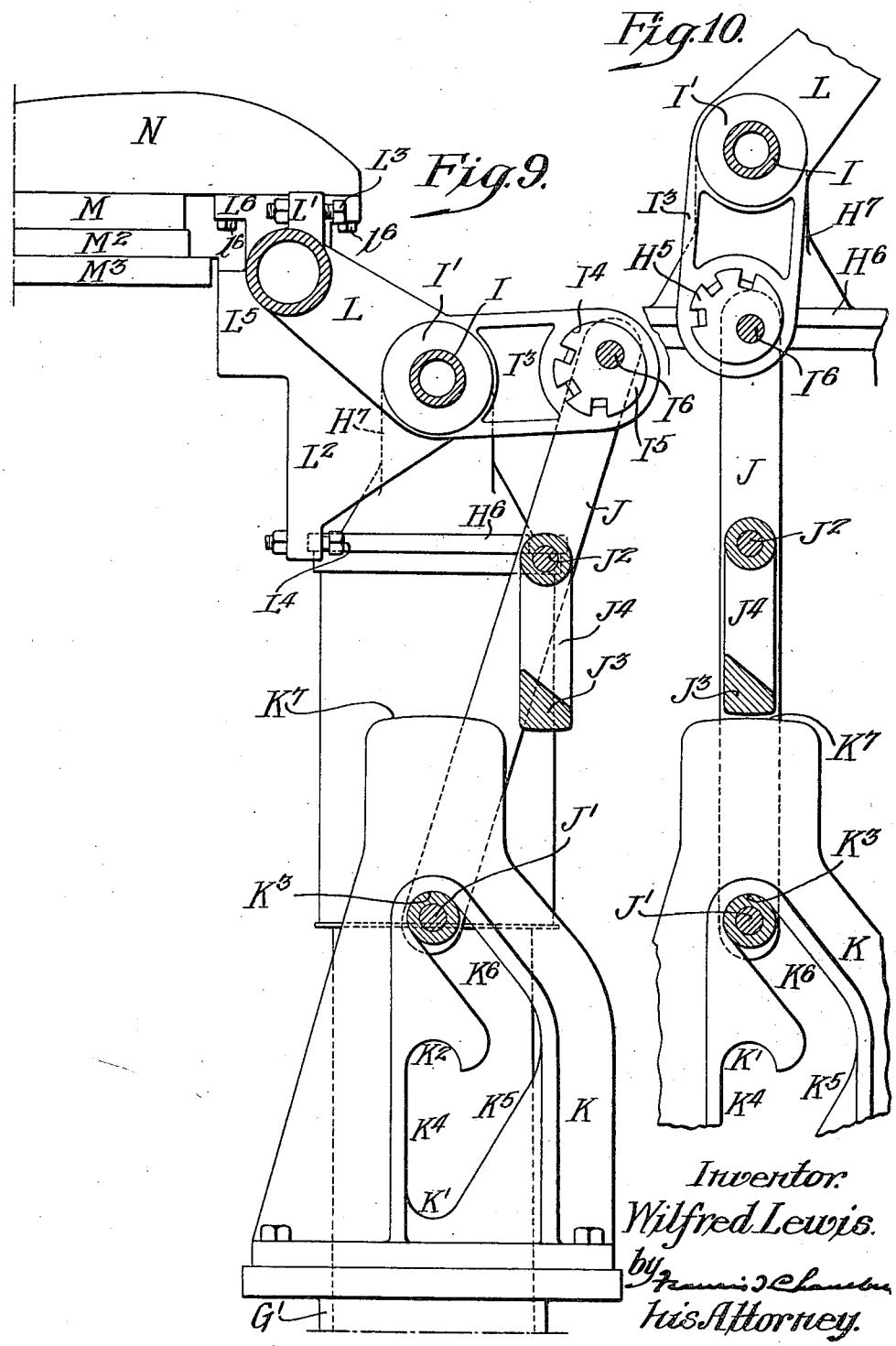

Patented May 22, 1923.

1,456,318

UNITED STATES PATENT OFFICE.

WILFRED LEWIS, OF HAVERFORD, PENNSYLVANIA, ASSIGNOR TO THE TABOR MANUFACTURING COMPANY, OF PHILADELPHIA, PENNSYLVANIA, A CORPORATION OF PENNSYLVANIA.

ROLL-OVER MOLDING MACHINE.

Application filed May 13, 1921. Serial No. 469,240.

*To all whom it may concern:*

Be it known that I, WILFRED LEWIS, a citizen of the United States of America, and resident of Haverford, in the county of Montgomery, in the State of Pennsylvania, have invented certain new and useful Improvements in Roll-Over Molding Machines, of which the following is a true and exact description, reference being had to the accompanying drawings, which form a part thereof.

My invention relates to roll over molding machines and has for its object to generally improve the construction of such machines and particularly to provide a construction by which the force acting to turn the roll over frame on its pivots would be applied to a single actuating lever symmetrically disposed between the sides of said frame and a construction also which makes it practicable to assemble the mold forming mechanism, roll over mechanism and pattern drawing mechanism more compactly and in less space than has heretofore been the case. Another leading feature of my invention is to provide in connection with the actuating link connected with the actuating lever of the roll over frame, stops for engaging the link during the upward movement of the roll over frame and a guideway for guiding the link into engagement with the proper stops at proper times of a very simple and effective character, and another leading feature of my invention is to provide a safety stop mechanism acting to support the movable parts of the machine and prevent falling of the pattern plate and its supported load in case the roll over frame sticks on dead center.

The above and other features of my invention will be best understood as described in connection with the drawings which show a machine embodying my improvements in what I consider to be their best and most effective form and in which Figure 1 is a side elevation of my machine with the lower part of one of the lifting cylinders and pistons working therein shown in section and with one of the arms supporting the pattern plate partially cut away to show the mechanism for attaching and detaching the pattern plate from the supporting arms.

Figure 2 is a front view of the machine taken as on the line 2—2 of Fig. 1.

Figure 3 is a fragmentary view on a larger scale showing the tops of one of the lifting cylinders and pistons in section.

Figure 4 is a view showing the roll over frame, the link depending from its actuating lever, the stop mechanism and guideway for directing the stop actuating device at the end of the link with the proper stops and the safety stop block pivoted to the link, the parts being shown in the position they occupy when the pattern plate is resting on the molding machine.

Figure 5 is a similar view showing the parts illustrated in Fig. 4 in the position they occupy when the roll over frame is raised and the stop actuating device on the link comes in contact with the first stop.

Figure 6 is a similar view showing the roll over frame and other parts in the position they occupy when the frame has been turned upward to its highest position.

Figure 7 is a view of the same parts in the position they occupy when the roll over frame has been fully rolled over to position to bring the mold upon the mold supporting table.

Figure 8 is a view of the same parts showing their position when the roll over frame has been lowered to position and deposited the mold on the mold supporting table.

Figure 9 is a view of the same parts after the roll over frame has been raised to draw the pattern and immediately before it is rotated backward toward the molding mechanism, and Figure 10 is a view of the same parts in the positions they occupy when the roll over frame has been rotated backward to its highest position.

A indicates the mold ramming machine preferably, as shown, a jarring machine supported on a foundation $G^5$ entirely separate from the bed plate of the roll over portion of the machine but carefully spaced and aligned with respect to such mechanism as by being joined thereto by a light flexible plate such as is indicated at $g$. A' indicates the jarring table. B is a cylinder for raising and lowering the mold supporting table. B' is a plunger working in this cylinder and B² a mold supporting table supported on this plunger. C² is a frame supported on the plunger B' and carrying inclined guides indicated at C, C, on which rest the wedges indicated at C' which directly support the mold supporting table B² and by means of which the table is brought to position to fit against the mold deposited upon it and maintain the mold in proper alignment. The mechanism for operating the wedges forms no part of my present invention and is not illustrated in detail. E, E, are laterally projecting arms secured to the top of the cylinder B and carrying guideways at their ends in which move rods E' secured to the frame C² and carrying springs E² at their ends which when the piston B is moved upward will come in contact with the arms E and arrest the further movement of the plunger. F is a stop cylinder in which moves a plunger the upper end of which is indicated at F'. This plunger serves to limit the downward movement of plunger B' by contact with the arm C². G indicates the bed plate of the roll over mechanism and also, as shown, of the mechanism for operating the mold supporting table, which is formed, as shown, with cylindrical portions G' which form a part of the cylinder for raising and lowering the roll over mechanism. The lower parts of these cylinders are formed of cap pieces G, G', and the upper parts of these cylinders are bolted to the top of the portion G' as is indicated at G, G², and as best shown in Fig. 3. The bed plate G is supported, as shown, on the walls G² and g². G⁴ indicates the pit in which the bed plate is preferably located and G⁵ the independent foundation for the jarring machine A. H' indicates the hollow plunger, one fitting in each of the lifting cylinders and fitting in the portion G, G², as shown in Fig. 3. The lower portion of this plunger extends down through the cylinder extension G', GG', and is formed with a head at the bottom through which is formed a passage indicated at H², Fig. 1, secured to the bottom of the cylinder and extending out through the passage H² is the rod H³ on which is formed or secured the enlargement indicated at H⁴ of a size which will nearly but not quite fill the passage H² when in registry with it. h⁴ is a baffle plate or diaphragm sliding on the rod H³ and resting on stops in the piston H' partly but not entirely filling the hollow piston and serving simply to check currents of liquid from reaching the surface and breaking into foam. H⁵ indicates an annular cylindrical shell secured to the flange H⁶ at the top of the flange and extending down over the top of the cylinder. This shell is shown broken away in Fig. 3 and in full in Fig. 1. h⁷ (see Fig. 3) is the cap or head of the plunger H' supporting at its top the lower portion H⁷ of the bearing for the roll over frame pivot indicated at I; H⁸ indicating the upper portion of this bearing. H⁹ is a cap bolted to the lower end of the plunger H' through port H² of which liquid is made to pass. This cap extends slightly beyond the diameter of the piston H' forming a stop to limit its upward movement against the guide cylinder G, G², when the roll-over mechanism is converted into a stripping mechanism, by detaching the anchor links J from the arm I³. When the pin I⁶ is removed, the roll-over frame L can be raised vertically to lift a cope flask through a stripping plate and thus the same mechanism becomes available for drags that must be rolled over to draw the pattern or for copes through a stripping plate if need be or without one if possible. Here the plungers H', H', acting together as one, and lubricated throughout by the liquid medium for the transmission of power constitute a perfect pattern guide for either copes or drags.

The pivot I is, as shown, in the form of a hollow shaft for reasons which will be explained. I' is the portion of the roll over frame which fits and rotates on the bearing shaft I constituting in effect a tubular rock shaft. I³ is the actuating arm and lever of the roll over frame extending out from the portion I' midway between its ends and having in its outer end a tubular bushing I⁴ in which fits an angularly adjustable block I⁵ carrying eccentric pins indicated at I⁶. To these pins are pivotally secured the plates J, J, forming a link and carrying at their lower end the stop engaging roller indicated at J'. J² is a pivot pin extending between the plates J, J, of the link and carrying the emergency stop lock indicated at J³ which is partly cut away as indicated at J⁴ for reasons which will be explained. K is an upwardly extending bracket secured to the bed plate of the machine centrally between the two lifting cylinders. K' is the bottom of a slot formed through the bracket and extending upward, as shown at K⁴, to a stop K²; also extending from the bottom of the slot is the guideway K⁵, K⁶, inclined toward the molding machine side of the apparatus and extending up around the stop K² to the upper stop indicated at K³. K⁷ is a safety stop ledge formed at the top of the bracket.

Extending from the rock shaft I' of the roll over frame are the arms L, L, from which extend on one side the brackets L' and on the other side the brackets L², L³ and L⁴ indicating adjustable stops secured to these brackets which in the extreme positions of the roll over frame rest against fixed stops and hold the pattern plate in horizontal position. From the brackets L² extend the abutments L⁵. L⁷ is a tubular extension of the roll over frame formed on the ends of the arms L and supporting the ledge L⁶ to which by means of the bolts indicated at l⁶, l⁶, the arms N, N, which support the pattern plate indicated at M are secured. M² and M³ are board platforms resting on the pattern plate and upon it, as is usual, rests the flask.

It is necessary that the pattern plate should be detached from the roll over mechanism when it is brought down upon the table of the jarring machine, and firmly attached to it in other positions of the roll over table. The mechanism which I prefer to use for this purpose is indicated in Fig. 1. The pattern plate M is formed with lug engaging detents as indicated at M', M', and to each of the arms N are secured the pivot lugs indicated at N', which in turn are pivotally secured to the rod indicated at N². N³ is an upwardly extending lug secured on the rod N² and carrying at its upper end the locking dog N⁴. N⁵ is a similar upwardly extending lug secured to a sleeve N⁶ slidingly mounted on the rod N² and carrying at its end the locking dog indicated at N⁷. This lug has a rearwardly extending arm N⁸. N⁹ is a spring secured to the lug N⁵ and to the lug N³ and tends to draw the lug N⁵ toward the lug N³, N¹⁰ being tension adjusting devices for this spring. N¹¹ is a pivot pin attached to the arm N⁸ and to which is pivotally secured the lever N¹², pivotally attached also at N¹³ to the rod N² and at its lower end to a link O which is pivotally attached to the end of a lever O' which lever, or rather levers, as there is one at each side of the machine, are journalled on the shaft I and provided with a stop shoulder O² which in one of the positions of the parts of the machine comes in contact with the stop indicated at O³.

Referring to the pipe and valve system indicated in Fig. 2; Q is an oil tank and P a pipe leading from a source of air pressure not shown. A branch pipe P' connects through pipe P² with the top of the tank Q and a by-pass pipe P³ having in it a pressure regulating device indicated at P⁴ which also connects the pipe P' with the pipe P². A cock P⁵ is provided to connect the pipe P' either directly with the pipe P² or with this pipe through by-pass P³ and in one position to permit the escape of air from the tank through the pipe P². From the bottom of the tank Q leads the pipe R having branches R' and R² which connect with the cylinders B and F as indicated in Fig. 1. r' and r² are valves for opening and closing these pipes. S is a pipe leading from the pipe P having a regulating cock S', the pipe S connecting through a flexible hose S² with a device which, as it forms no part of my invention I have not shown in detail, for actuating the wedges C'. S³ is another pipe leading from the pipe P and having branches S⁴ and S⁵ which are opened and closed by a cock S⁶ and which connect through flexible hose indicated at S⁷ and S⁸ with the mechanism for actuating the wedges which mechanism is of such a character as to advance the wedges to operative position when air is turned on through the pipe S and retract them when air is turned on through the pipes S⁴ and S⁵. T is a pipe leading from the pipe P having a regulating cock T', the pipe connecting through a flexible hose T² with a pipe T³ having a branch T⁴ which leads into the top of the hollow piston H as indicated in Fig. 3. Another branch T⁵ leading through the hollow shaft I and connecting with the other hollow piston H'. Another pipe U leading from the pipe P and having a cock U' connects through a flexible extension to the pipe U² having a branch U³ connected with the vibrator U⁶ attached to the pattern plate, and another branch which extends through the tubular portion L⁷ of the roll over frame and connects with the vibrator U⁷ on the other side of the machine.

By using two lifting cylinders instead of one it is obvious that each of the two cylinders may and will be of considerably less diameter than a single cylinder and hence that the mold forming section of the machine, as shown, the jarring machine A, and the flask supporting mechanism on the other side of the machine, can be placed closer to the center line of the lifting cylinder from which it follows, of course, that the mold can be supported closer to the pivotal support of the roll over frame, this feature of construction enabling a smaller floor space to be occupied by the apparatus and less power to be employed in rolling over the flask. The practical advantage of the two lifting cylinders placed at a sufficient distance apart enables me to place the actuating lever of the roll over frame centrally between the sides of this frame and to use a single actuating lever so placed instead of two such levers located at the sides of the roll over frame. This is a very marked feature of advantage and it is naturally difficult where two actuating levers are employed to have power applied to both of them simultaneously.

Heretofore more or less complicated mechanism has been employed to guide the links, which are pivotally attached to the actuating levers of the roll over frame, into engagement with the stops which arrest its upward movement with the frame and which through it effects the roll over of the frame as the frame continues to rise. The simple guideway system which I provide in my upwardly extending stop holding bracket is a notable improvement on the devices heretofore employed and is obviously capable of use where a single lifting cylinder is employed as well as where two are employed though it has marked advantages in the particular organization shown in my drawings.

Another point of great practical importance lies in the fact that in my construction the jarring machine is not supported on the bed plate of the roll over mechanism and hence the roll over mechanism is not jarred with the consequent wear of joints which is unavoidable when the jarring motion is communicated to this mechanism.

To explain the operation of the described mechanism I would say that in Fig. 1 the parts are shown in the position they occupy when the pattern plate M is raised on the top of the jarring machine table A'; the lifting pistons H' are in their lowermost position in the lifting cylinders and the pattern plate supporting arms N are unlocked from and moved down below the pattern plate, the unlocking of the arms N from the pattern plate is effected by the contact of the stop ledge $O^2$ of the lever arm O' with the fixed stop $O^3$. This contact is effected as the roll over motion toward the jarring machine is completed, the contact with the stop $O^3$ being effected at about or just before the time the pattern plate comes down upon the jarring machine table and the further downward movement of the arms N effects through the link O a thrust toward the right of the lower end of the lever $N^{12}$ and corresponding movement toward the left of the pivot pin $N^{11}$ at the top of this lever, it being attached to the arm $N^8$ and the jar $N^7$ draws this jaw back toward the left while at the same time the motion of the lever $N^{12}$ thrust the rod $N^2$ toward the right forcing the jaw $N^4$ toward the right, the jaws thus releasing their contact with the locking detents M' and moving down to the position shown in Fig. 1. Obviously, as the arms N are raised on the reversed movement of the roll over frame the locking jaws are moved into registry with and engaged with the locking detents M' of the pattern plate and the pattern plate thus locked to the arms N' during all their movements of the roll over frame. In the position of the roll over frame and its actuating mechanism shown in Figs. 1 and 4, the stop engaging roll J' at the bottom of the link bars J, J, is at or near the bottom K' of the vertical groove $K^4$ and gravity will obviously keep the roll $J^5$ in contact with the left hand wall of this group. It being desired now to roll over the pattern plate and flask supported upon it, air is admitted to the tops of the hollow pistons H' through the pipes $T^4$ and $T^5$. The air passes down around the baffle plate $h^4$ and through the port $H^2$ at the bottom of the piston into the bottom of the lifting cylinder, and the lifting plunger or piston H' is raised carrying with it, of course, the roll over frame which is pivoted on the shaft I firmly gripped by bearings at the top of the lifting plungers. During the first part of this lifting operation the stops $L^3$ are in contact with the heads of the lifting plungers, as shown in Fig. 4, so that the pattern plate remains horizontal. The choke block $H^4$, see Fig. 1, is so located on the rod $H^3$ that it will lie within the restricted passage $H^2$ at the bottom of the plunger H' and slow up the movements of the plunger during periods when it is desirable to do so, as when the stop engaging roller J' on the link J is about to come in contact with the stop. As the lifting plungers raise the roll over frame the stop engaging device J' of the links J after travelling up the guideway $K^4$, come in contact with the stop $K^2$, as shown in Fig. 5, after which a further upward movement of the lifting plungers and roll over frame draws down the actuating arm $I^3$ of the roll over frame until the parts assume the position shown in Fig. 6 in which position the center of gravity of the flask and attached parts should be so located as to carry the flask over the dead center, while, of course, the further upward movement of the lifting plungers is arrested. After this, air is released from the lifting cylinders and the parts assume the position shown in Fig. 7 with the stops $L^4$ resting against the top of the lifting plungers and the pattern plate held in horizontal position. The further downward motion of the lifting plungers carries the mechanism to the position shown in Fig. 8 in which position the flask should hang close to the top of the table $B^2$. This table is then raised by pressure admitted through the reducing valve $P^4$ adjusted to take the weight of the flask upon a pivotal cantilever, as shown and described in my earlier Patent 1,157,404 of October 19, 1915, after which the wedges C are engaged to hold it firmly in place and the clamps which secure the flask to the pattern plate are removed preparatory to drawing the pattern.

Ordinarily the pattern will now be lifted and rolled back into ramming position to receive another flask, or, if very deep, additional draft may be obtained by dropping the table until the arm $C^2$ descends against the plunger F' set to receive it, and lifting at the same time. When the flasks used are uniform in depth, the plunger F' may be set to hold the table against the flask when rolled over and the use of the reducing valve $P^4$ may be omitted.

In the position shown in Fig. 8 it will be observed that gravity tends to press the stop roller J' against the right hand edge of the guideway $K^5$ which guideway, together with its extension K⁶ extends around the stop K² and leads to stop K³.

The next operation to be performed is drawing the pattern which is effected by the upward movement of the roll over frame carried by the lifting plungers, the frame being held in horizontal position at the sides L⁷. As the plungers move upward to draw the pattern the guide contacting roll J' moves up through the guideways K⁵ and K⁶ until it comes in contact with the stop K³, as shown in Fig. 9. At this point the pattern is fully drawn and a further upward movement of the roll over frame carries the parts to the position shown in Fig. 10 in which the flask should have passed a dead center, after which the lifting plungers and roll over frame are lowered until the parts come to the position shown in Fig. 4.

Referring next to the safety stop it may be stated that in roll over molding machines it some times occurs that the roll over frame sticks on dead center. Where this occurs there is, of course, always the danger that the frame and flask may fall after the lifting mechanism has begun to descend with great danger of injury and breakage to the machine. To prevent this, I provide a safety stop ledge, which may conveniently consist of the top K⁷ of the bracket K, and I provide on the link J the safety stop block J³, the upper end of which, that is, its pivotal point of attachment to the link or link bars, is so located that when the parts of the machine are in the position shown in Fig. 6 it will lie close to the ledge K⁷ and immediately above it as shown in said figure, while, when the parts are in the position shown in Fig. 10 the lower end of the pivot block J³ will lie immediately above and close to the stop ledge as shown in Fig. 10. The pivot stop block is preferably cut away in the center, as shown at J⁴, the slot or guideway portion being of such dimensions as will permit the corners of the ledge K⁷ to pass into it, as shown in Figs. 6 and 8. When the machine parts are in the position shown in these figures the movements of the pivot stop block are shown progressively in Figs. 4, 5, 6, 7, 8, 9 and 10, and it will be observed that in either position of the roll over frame in which it may stick on dead center the stop block lies immediately above and close to the ledge K⁷ so that if the roll over frame remains on dead center the lowering of the frame will bring the stop block into contact with the ledge K⁷ and arrest further downward movement, thus effectually preventing any danger of flask and frame falling over with the resultant dangers of breakage.

Where it is found that in any condition of use there is a liability for the roll over frame to stick on dead center, this danger can be avoided by turning the eccentric block I⁵.

Having now described my invention, what I claim as new and desire to secure by Letters Patent, is:

1. In a roll over molding machine, mechanism for giving the desired movements to the pattern plate consisting of a pivoted roll over frame having an actuating lever in combination with means for raising and lowering the pivotal support for said frame, an upwardly extending bracket in line with the actuating lever of the frame having upper and lower stops and a guideway extending down from the lower stop and then upwardly on an incline towards the ramming side of the machine to the upper stop, a link depending from the end of the actuating lever and a stop engaging device secured to the lower end of said link and engaged in said guideway.

2. In a roll over molding machine, mechanism for giving the desired movements to the pattern plate consisting of a pivoted roll over frame having an actuating lever in combination with means for raising and lowering the pivotal support for said frame, two stops secured in line with the actuating lever of the frame and a safety stop ledge, a link depending from the end of the actuating lever, a stop engaging device secured to said link, means for guiding said device to engage the upper and lower stops in proper sequence, a pivoted safety stop block secured to said link and located and proportioned to engage the safety stop ledge and prevent the filling of the roll over frame when it stops on dead center.

3. In a roll over molding machine, mechanism for giving the desired movements to the pattern plate consisting of a pivoted roll over frame having arms for supporting the pattern plate and a centrally disposed actuating lever in combination with two cylinders and pistons working therein, a pivotal support for the roll over frame supported on said pistons, stops located at different levels between the cylinders, a link extending from the actuating lever having a stop engaging device at its lower end and means for guiding the stop engaging device to engage with the stops in proper sequence.

4. In a roll over molding machine, mechanism for giving the desired movements to the pattern plate consisting of a pivoted roll over frame having arms extending from its ends for supporting the pattern plate and a centrally located actuating lever in combination with two actuating cylinders and pistons a pivotal support for the roll over frame rigidly attached to the tops of the two pistons, stops located at different levels between the cylinders, a link extending from the actuating lever of the roll over frame having a stop engaging device at its lower end and means for guiding the stop engaging device to engage with the stops in proper sequence.

5. In a roll over molding machine, mechanism for giving the desired movements to the pattern plate consisting of a pivoted roll over frame having arms for supporting the pattern plate and a centrally disposed actuating lever, in combination with two cylinders and pistons working therein, a pivotal support for the roll over frame supported on said pistons, stops located at different levels between the cylinders, a link extending from the actuating lever having a stop engaging device at its lower end, means for guiding the stop engaging device to engage with the stops in proper sequence, a swinging stop block pivoted to the link aforesaid and an abutment for said stop block located to engage it and support the weight of the vertically movable parts of the machine when the roll over mechanism remains on dead center.

6. In a roll over molding machine, mechanism for giving the desired movements to the pattern plate consisting of a pivoted roll over frame having arms for supporting the pattern plate and a centrally disposed actuating lever, in combination with two cylinders and pistons working therein, a pivotal support for the roll over frame supported on said pistons, an upwardly extending bracket located between the cylinders in registry with the actuating lever of the roll over frame, said bracket having stops located on it at different levels and a guideway extending downward from the lower stop and then upward on an incline towards the mold ramming side of the machine, said guideway avoiding the lower stop and extending to the upper stop, a link extending from the actuating lever of the roll over frame and a stop engaging device on the lower end of said link engaged and movable in said guideway.

7. In a roll over molding machine, mechanism for giving the desired movements to the pattern plate consisting of a pivoted roll over frame having arms for supporting the pattern plate and a centrally disposed actuating lever, in combination with two cylinders and pistons working therein, a pivotal support for the roll over frame supported on said pistons, an upwardly extending bracket located between the cylinders in registry with the actuating lever of the roll over frame, said bracket having stops located on it at different levels and a guideway extending downward from the lower stop and then upward on an incline towards the mold ramming side of the machine, said guideway avoiding the lower stop and extending to the upper stop, said bracket also having its upper end formed to serve as a stop ledge to engage the swinging stop block, a link extending from the actuating lever of the roll over frame and a stop engaging device on the lower end of said link engaged and movable in said guideway, a swinging stop block attached to the link positioned and proportioned to engage the stop ledge and prevent the fall of the roll over frame when it stops on dead center.

WILFRED LEWIS.